(12) United States Patent
Huang et al.

(10) Patent No.: US 8,200,225 B2
(45) Date of Patent: *Jun. 12, 2012

(54) METHODS FOR INTEGRATING CELL MEASUREMENT PROCEDURES OF A COMMUNICATION APPARATUS AND COMMUNICATION APPARATUSES UTILIZING THE SAME

(75) Inventors: Li-Chi Huang, Chung-Ho (TW); Ming-Wan Hsu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,074

(22) Filed: Jan. 17, 2012

(65) Prior Publication Data

US 2012/0115486 A1    May 10, 2012

Related U.S. Application Data

(63) Continuation of application No. 12/416,259, filed on Apr. 1, 2009, now Pat. No. 8,121,601.

(51) Int. Cl.
*H04W 36/00* (2009.01)
(52) U.S. Cl. .................. 455/436; 455/552.1; 455/414.1; 455/558
(58) Field of Classification Search .............. 455/432.1, 455/432.3, 434, 435.2, 435.3, 436, 438, 439, 455/442, 450, 452.1, 556.1, 557, 558; 370/329, 370/331
See application file for complete search history.

(56) References Cited

U.S. PATENT DOCUMENTS

| 6,185,436 | B1 * | 2/2001 | Vu ................................ 455/558 |
| 2003/0125073 | A1 | 7/2003 | Tsai et al. |
| 2003/0129971 | A1 | 7/2003 | Gopikanth |
| 2008/0146280 | A1 * | 6/2008 | Sasse et al. .................. 455/558 |
| 2009/0088154 | A1 | 4/2009 | Umatt et al. |
| 2009/0285170 | A1 | 11/2009 | Rangaiah |
| 2010/0279698 | A1 * | 11/2010 | Wong ........................... 455/450 |

FOREIGN PATENT DOCUMENTS

| EP | 1 240 793 | 7/2004 |
| EP | 1 962 535 | 8/2008 |

* cited by examiner

*Primary Examiner* — Jean Gelin
(74) *Attorney, Agent, or Firm* — Thomas|Kayden

(57) ABSTRACT

A communication apparatus has at least one radio transceiver module, a first subscriber identity card and a second subscriber identity card, where the first subscriber identity card corresponds to a first public land mobile network (PLMN), and the second subscriber identity card corresponds to a second PLMN. The communication apparatus includes processor logic determining whether the first PLMN and the second PLMN are the same, and for suspending a measurement procedure and a cell reselection procedure of one of the first subscriber identity card and the second subscriber identity card to reduce battery power consumption. Processor logic further triggers an unsuspended measurement procedure to tune the radio transceiver module to a plurality of corresponding channel frequency/frequencies of the neighbor cells.

9 Claims, 14 Drawing Sheets

METHODS FOR INTEGRATING CELL MEASUREMENT PROCEDURES OF A COMMUNICATION APPARATUS AND COMMUNICATION APPARATUSES UTILIZING THE SAME

CROSS REFERENCE TO RELATED APPLICATIONS

This application is a Continuation of application Ser. No. 12/416,259, filed Apr. 1, 2009, now U.S. Pat. No. 8,121,601, the entirety of which is incorporated by reference herein.

BACKGROUND OF THE INVENTION

1. Field of the Invention

The invention relates to an intelligent system information (SI) management method, and more particularly to an intelligent SI management method for a communication apparatus equipped with more than one subscriber identity card to integrate cell measurement procedures for reducing power consumption.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and -defined cellular communication technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard, that uses code division multiple access (CDMA) technology. The UMTS (Universal Mobile Telecommunications System) is a 3G mobile communications system, which provides an enhanced range of multimedia services over the 2G GSM system. The Wireless Fidelity (Wi-Fi) is a technology defined by the 802.11b engineering standard and can be used for home networks, mobile phones, video games, to provide a high-frequency wireless local area network.

With the advanced development of wireless communication technologies, it is now possible to provide multiple wireless communication services using different or the same communication technologies in one communication apparatus. Because battery sustainability is always an important issue for an electronic device, intelligent system information (SI) management methods for a communication apparatus equipped with more than one subscriber identity card to reduce power consumption are desired.

BRIEF SUMMARY OF THE INVENTION

Communication apparatuses and methods for integrating cell measurement procedures of a communication apparatus in a communication system are provided. An embodiment of a communication apparatus comprises at least one radio transceiver module, a first subscriber identity card corresponding to a first public land mobile network (PLMN), a second subscriber identity card corresponding to a second PLMN and a processor. The first subscriber identity card camps on a first serving cell belonging to the first PLMN and receives a first neighbor cell list comprising a corresponding channel frequency of at least one neighbor cell of the first serving cell via the radio transceiver module. The second subscriber identity card camps on a second serving cell belonging to the second PLMN and receives a second neighbor cell list comprising a corresponding channel frequency of at least one neighbor cell of the second serving cell via the radio transceiver module. The processor is coupled to the first subscriber identity card, the second subscriber identity card and the radio transceiver module, merges the first neighbor cell list and the second neighbor cell list to obtain a merged neighbor cell list, tunes the radio transceiver module to the corresponding channel frequency/frequencies of the neighbor cells in the merged neighbor cell list to respectively receive a plurality of signals from the neighbor cells therein, and accordingly measures and evaluates quality of the neighbor cells therein.

An embodiment of a method for integrating cell measurement procedures of a communication apparatus in a communication system is performed by a processor and comprises: receiving a first neighbor cell list comprising a corresponding channel frequency of at least one neighbor cell of a first serving cell camped on by a first subscriber identity card via a radio transceiver module; receiving a second neighbor cell list comprising a corresponding channel frequency of at least one neighbor cell of a second serving cell camped on by a second subscriber identity card via the radio transceiver module; merging the first neighbor cell list and the second neighbor cell list to obtain a merged neighbor cell list; using the radio transceiver module to receive a plurality of signals from the neighbor cells in the merged neighbor cell list; accordingly measuring and evaluating quality of the neighbor cells therein.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
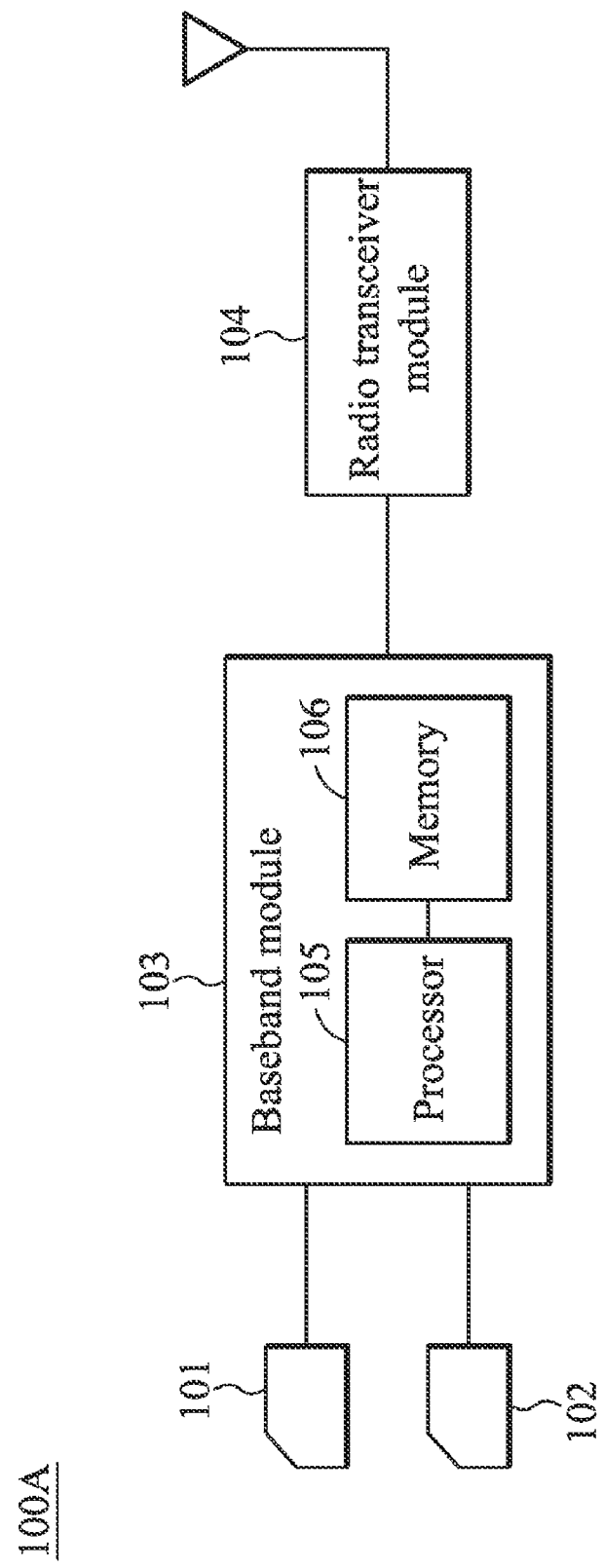
FIG. 1 shows a communication apparatus according to an embodiment of the invention.

FIG. 1 shows a communication apparatus according to an embodiment of the invention. As shown in FIG. 1, communication apparatus 100A comprises subscriber identity cards 101 and 102, a baseband module 103, and a radio transceiver module 104, wherein the baseband module 103 is coupled to the subscriber identity cards 101 and 102, and the radio transceiver module 104. The radio transceiver module 104 receives wireless radio frequency signals, converts the received signals to baseband signals to be processed by the baseband module 103, or receives baseband signals from the baseband module 103 and converts the received signals to wireless radio frequency signals to be transmitted to a peer device. The radio transceiver module 104 may comprise a plurality of hardware devices to perform radio frequency conversion. For example, the radio transceiver module 104 may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz for a Universal Mobile Telecommunications System (UMTS). The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 103 further comprises a memory device 106 and a processor 105 for controlling the operations of the baseband module 103, the radio transceiver module 104, and the subscriber identity cards 101 and 102 plugged into two sockets, respectively. The processor 105 reads data from the plugged in subscriber identity cards 101 and 102 and writes data to the plugged subscriber identity cards 101 and 102. It is to be noted that the memory device 106 may also be configured outside of the baseband module 103 and the invention should not be limited thereto.

Figure 2:
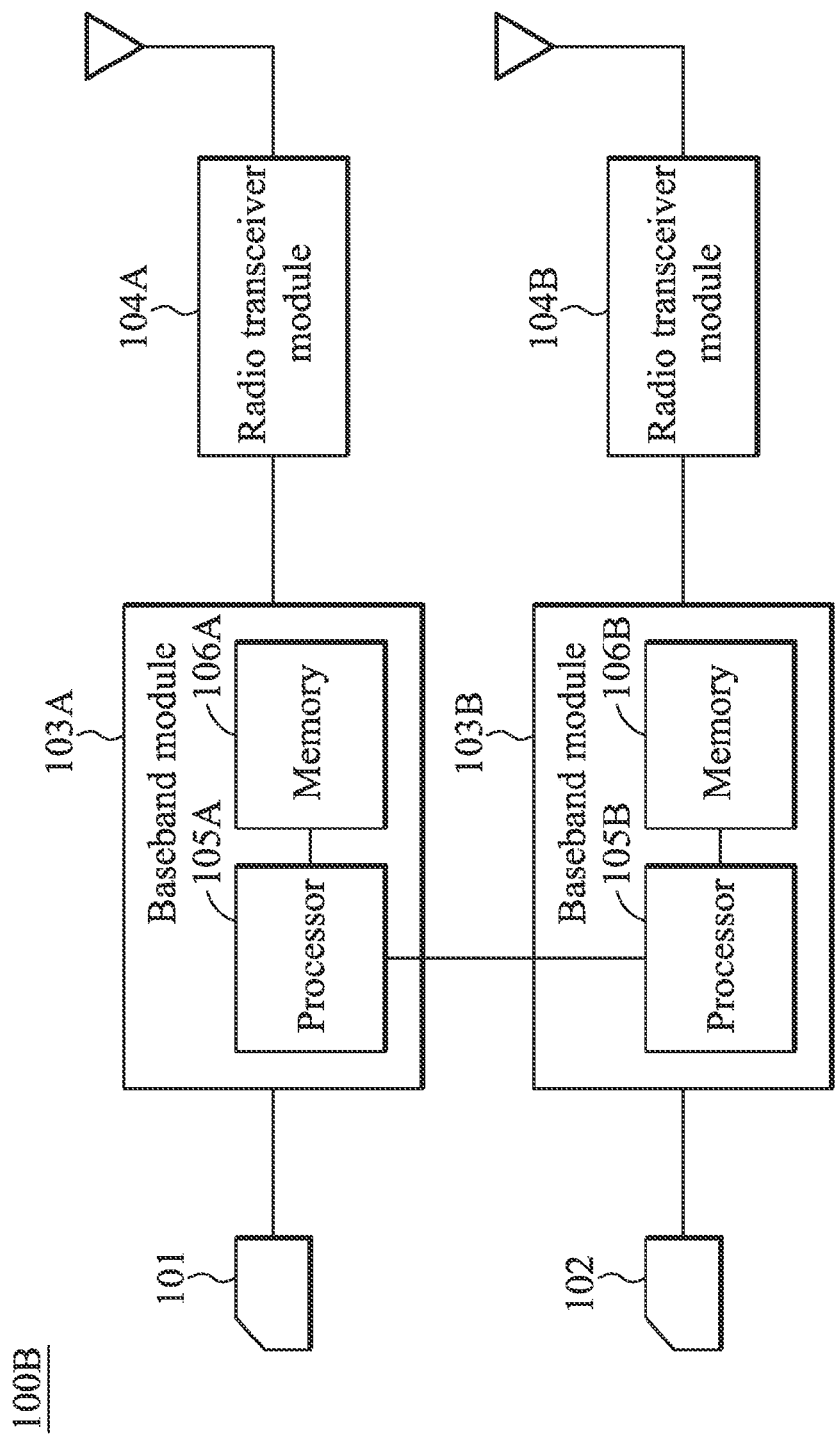
FIG. 2 shows a communication apparatus according to another embodiment of the invention.
Figure 3:
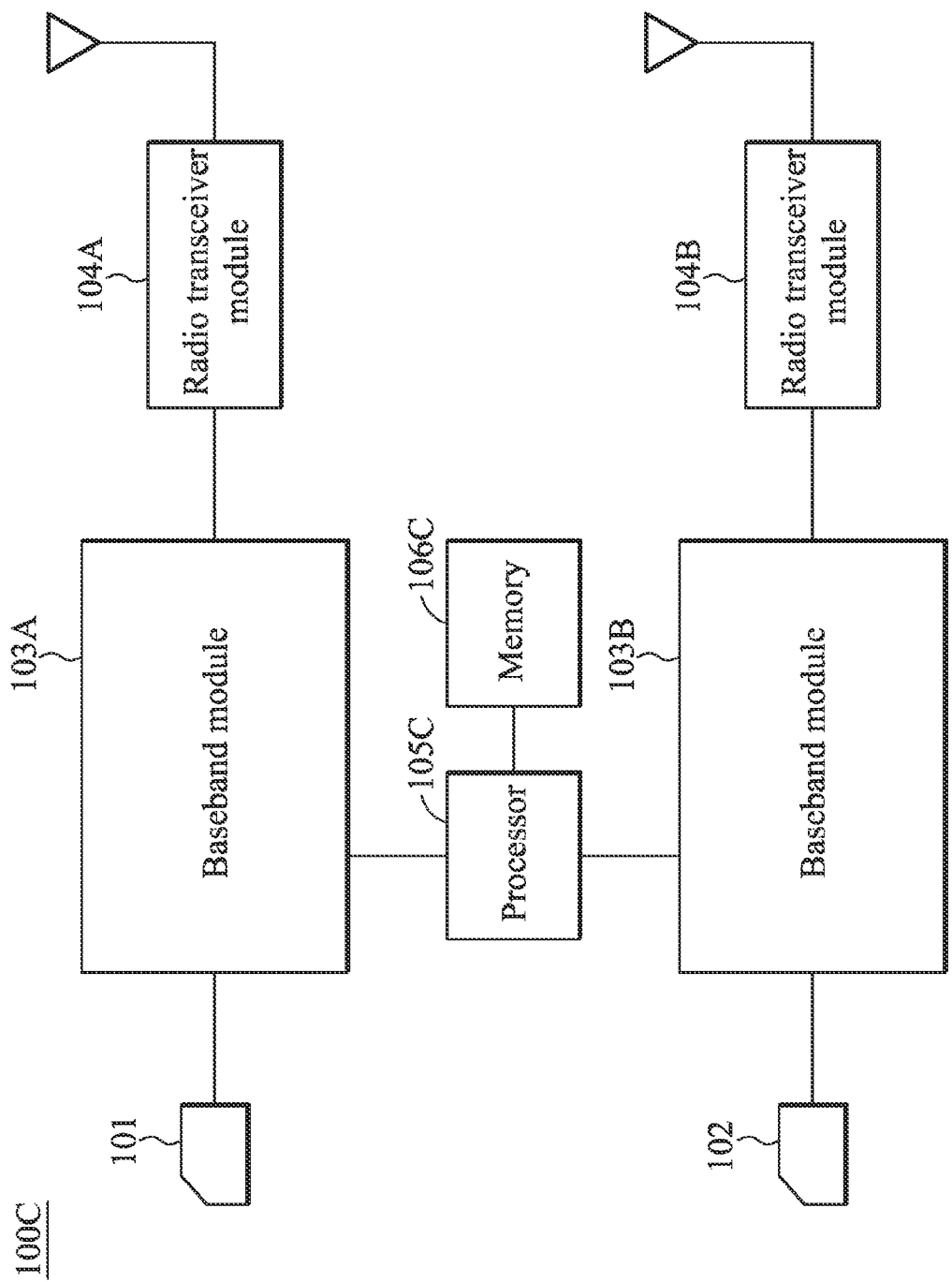
FIG. 3 shows a communication apparatus according to another embodiment of the invention.

According to another embodiment of the invention, the communication apparatus comprising more than one subscriber identity card, may also comprise more than one baseband module and radio transceiver module, respectively, for each subscriber identity card. FIG. 2 and FIG. 3 respectively show communication apparatuses according to other embodiments of the invention. As shown in FIG. 2 and FIG. 3, communication apparatus 100B comprises subscriber identity cards 101 and 102, baseband modules 103A and 103B, and radio transceiver modules 104A and 104B, wherein the baseband module 103A is coupled to the subscriber identity card 101 and the radio transceiver module 104A, and the baseband module 103B is coupled to the subscriber identity card 102 and the radio transceiver module 104B. The operations of the baseband modules 103A and 103B are similar with that of the baseband module 103 and are not described here for brevity. Similarly, the operations of the radio transceiver module 104A and 104B are similar with that of the radio transceiver module 104 and are not described here for brevity. It is noted that in FIG. 2, the baseband module 103A comprises a memory device 106A and a processor 105A for controlling the operations of the subscriber identity card 101, the baseband module 103A and the radio transceiver module 104A, and the baseband module 103B also comprises a memory device 106B and a processor 105B for controlling the operations of the subscriber identity card 102, the baseband module 103B and the radio transceiver module 104B. The processors 105A and 105B may be coupled and communicate with each other. The data stored in memory devices 106A and 106B may be shared and accessed by both of the processors 105A and 105B. For example, one of the processors may be a master processor and the other one may be a slave processor to cooperate with the master processor. As shown in FIG. 3, according to still another embodiment of the invention, the communication apparatus 100C may comprise one memory device 106C and one processor 105C for controlling the operations of the subscriber identity cards 101 and 102, the baseband modules 103A and 103B, and the radio transceiver modules 104A and 104B. The operations of the processor 105C are similar with that of the processor 105 and are not described here for brevity. The described processors 105, 105A, 105B and 105C may be general-purpose processors when executing program code perform the mentioned control operations. The described memory 106, 106A, 106B and 106C may comprise at least one of read only memory (ROM), random access memory (RAM), NOR flash and NAND flash for storing program code and data.

Figure 4:
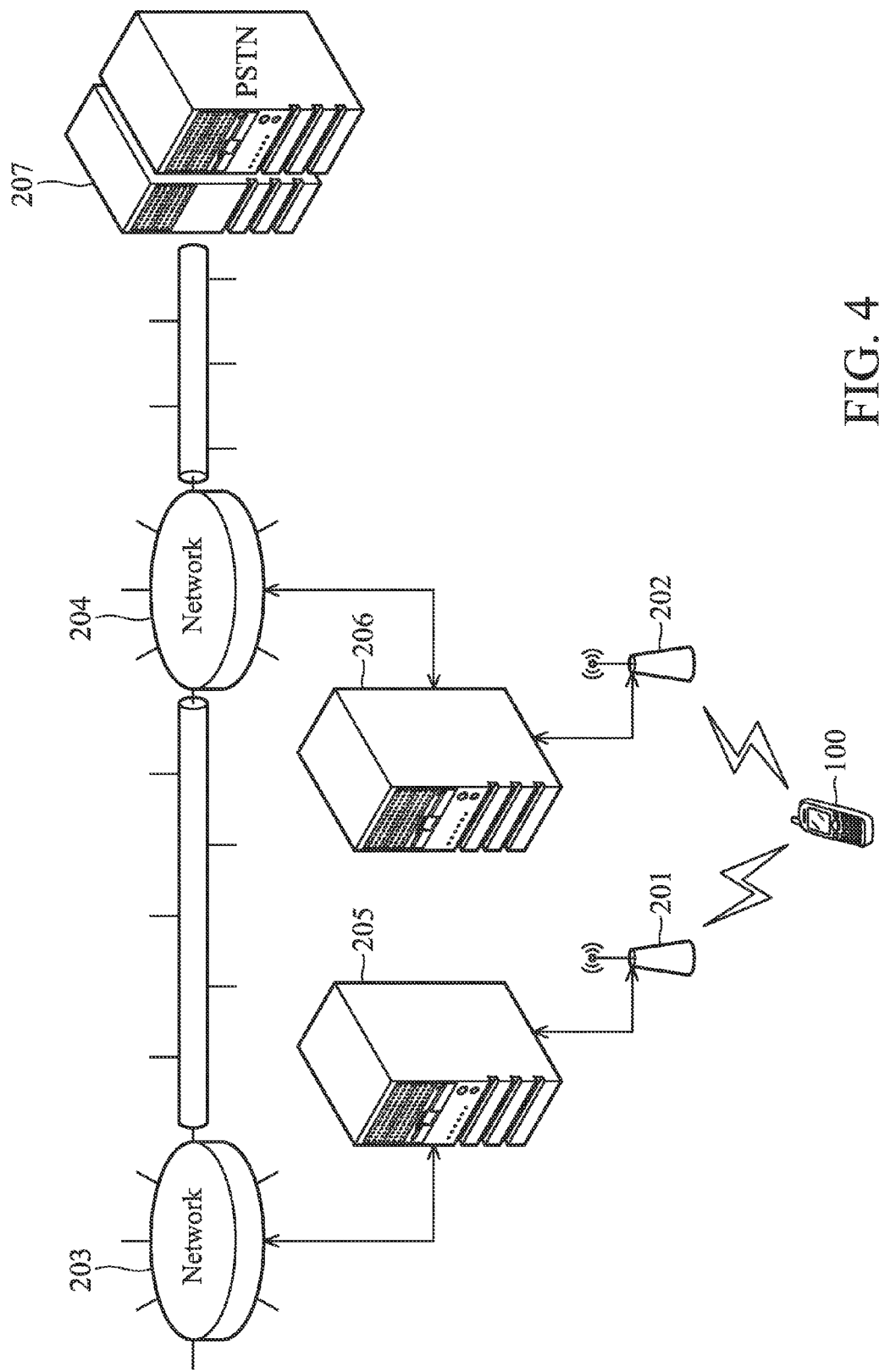
FIG. 4 shows an exemplary network topology according to an embodiment of the invention.

FIG. 4 shows an exemplary network topology according to an embodiment of the invention. The communication apparatus 100 shown in FIG. 4, may be the communication apparatuses 100A, 100B and 100C previously illustrated in FIG. 1 to FIG. 3. Thus, from hereinafter, the communication apparatus 100 will be used to represent all like previously described apparatuses for brevity. The communication apparatus 100, equipped with more than one subscriber identity card, may simultaneously access more than one network 203 and 204 of the same or different communication technologies, where the network 203 or 204 may be the GSM, WCDMA, Wi-Fi, CDMA2000 or Time Division-Synchronous Code Division Multiple Access (TD-SCDMA) network, or Internet, or the like, after camping on or associating with the cells managed by access stations 201 and 202, where the access station 201 or 202 may be a base station, a node-B, an access point compatible with 802.1a, 802.1b or 802.1g. The networks 203 and 204 may be established by the same or different operators (or so-called public land mobile network (PLMN)). The communication apparatus 100 may issue an apparatus originated communication request, such as a voice call, a data call, a video call, or a voice over Internet Protocol (VoIP) call, to a called party (i.e. the corresponding peer of another wired or wireless communication apparatus) through at least one of the networks 203 and 204 with corresponding intermediary apparatuses 205 and 206 (for example, the GSM network with a Mobile Switching Center (MSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. Moreover, the communication apparatus 100 may receive an apparatus terminated communication request, also referred to as a mobile terminated (MT) call request, such as an incoming phone call, with any of the subscriber identity cards from a calling party. It is to be understood that there may be one or more gateways positioned between heterogeneous types of networks.

According to an embodiment of the invention, the subscriber identity cards 101 and 102 may relate to one type of wireless communication system. For example, the subscriber identity card 101 or 102 may be the subscriber identity module (SIM) card corresponding to the GSM system, or the universal subscriber identity module (USIM) card corresponding to the UMTS system, or the removable user identity module (RUIM) card or the CDMA Subscriber Identity Module (CSIM) card corresponding to the CDMA2000 communication system, or others. An SIM card typically contains user account information, an international mobile subscriber identity (IMSI) and a set of SIM application toolkit (SAT) commands and provides storage space for phone book contacts. The processor, such as 105, 105A, 105B or 105C, of the baseband module, such as 103, 103A or 103B, may interact with a micro control unit (MCU) of the SIM card to fetch data or SAT commands from the plugged in SIM card. The communication apparatus 100 is immediately programmed after being plugged into the SIM card. The SIM card may also be programmed to display custom menus for personalized services. The communication apparatus 100 may be plugged into an USIM card for UMTS (also called 3G) telephony communication. The USIM card stores user account information, IMSI, authentication information and a set of USIM Application Toolkit (USAT) commands and provides storage space for text messages and phone book contacts. The baseband processor 105, 105A, 105B or 105C may interact with an MCU of the USIM card to fetch data or SAT commands from the plugged in USIM card. The phone book on the USIM card is more enhanced than that on the SIM card. For authentication purposes, the USIM card may store a long-term pre-shared secret key K, which is shared with the Authentication Center (AuC) in the network. The USIM MCU may verify a sequence number, that may be within a range, by using a window mechanism to avoid replay attacks, and generates the session keys CK and IK to be used in the confidentiality and integrity algorithms of the KASUMI (also termed A5/3) block cipher in the UMTS system. The communication apparatus 100 is immediately programmed after being plugged into the USIM card. The IMSI is a unique number associated with a global system for mobile communication (GSM) or a universal mobile telecommunications system (UMTS) network user. The IMSI may be sent by the communication apparatus 100 to the GSM or UMTS network to acquire other details of the mobile user in the Home Location Register (HLR) or, as locally copied, in the Visitor Location Register (VLR). An IMSI is typically 15 digits long, but can be shorter. The first 3 digits are the Mobile Country Code (MCC), and the following digits, are the Mobile Network Code (MNC), which are either 2 digits (European standard) or 3 digits (North American standard). The remaining digits are the mobile subscriber identification number (MSIN) for the GSM or UMTS network user.

When the communication apparatus 100 equipped with more than one subscriber identity card (e.g. 101 and 102) is powered on, each subscriber identity card starts to search for a network and select a suitable cell to camp on. As an example, the subscriber identity card 101 belonging to a corresponding public land mobile network (hereinafter called the PLMNA for brevity) may camp on a cell (hereinafter called the Serving CellA for brevity) managed by an access station (e.g. 201 or 202 as shown in FIG. 4) belonging to the PLMNA, and the subscriber identity card 102 belonging to a corresponding public land mobile network (hereinafter called the PLMNB for brevity) may also camp on a cell (hereinafter called the Serving CellB for brevity) managed by an access station (e.g. 201 or 202) belonging to the PLMNB. The PLMNA and PLMNB may be the same or different PLMN, and when the PLMNA and PLMNB are the same PLMN, the Serving CellA and Serving CellB may be the same or different. After camping on the corresponding cell, each subscriber identity card receives a corresponding neighbor cell list (hereinafter called NCListA and NCListB for brevity) comprising a corresponding channel frequency of at least one neighbor cell via the radio transceiver module (e.g. 104, 104A or 104B). According to an embodiment of the invention, the communication apparatus 100 may intelligently determine how to integrate cell measurement procedures of two or more subscriber identity cards to save the battery power according to the PLMN and serving cells of subscriber identity cards. As an example, when the processor (e.g. 105, 105A, 105B or 105C) determines that the PLMNA and PLMNB are the same PLMN (as an example, according to the PLMN identity (PLMN ID) stored in the subscriber identity cards 101 and 102), the processor may merge the NCListA and NCListB (for example, by appending the information indicating the corresponding channel frequency of the neighbor cell(s) of the Serving CellB that does/do not exist in the NCListA of Serving CellA therein) and combine the cell measurement procedures of the subscriber identity cards into one measurement procedure, so as to prevent monitoring of the same neighbor cell twice, and further save power consumption. The merging of the neighbor cell lists is further described as the following example. When the NCListA comprises information indicating the corresponding channel frequency of neighbor cells A1 and A2, and the NCListB comprises information indicating the corresponding channel frequency of neighbor cells A2 and A3, the processor merges the NCListA and NCListB to obtain a merged neighbor cell list NCListC comprising information indicating the corresponding channel frequency of the neighbor cells A1, A2 and A3. That is, the merged neighbor cell list NCListC contains only one record for the common neighbor cell A2 that exists in both of the NCListA and NCListB. After obtaining the merged neighbor cell list NCListC, the processor may suspend a measurement procedure of one of the subscriber identity card 101 and 102 and leverage the measurement task to the unsuspended measurement procedure. Thus, the common neighbor cell of the subscriber identity cards 101 and 102 would not be measured twice and the measurement results stored in the memory (e.g. 106, 106A, 106B or 106C) may be shared between the subscriber identity cards 101 and 102.

Figure 5:
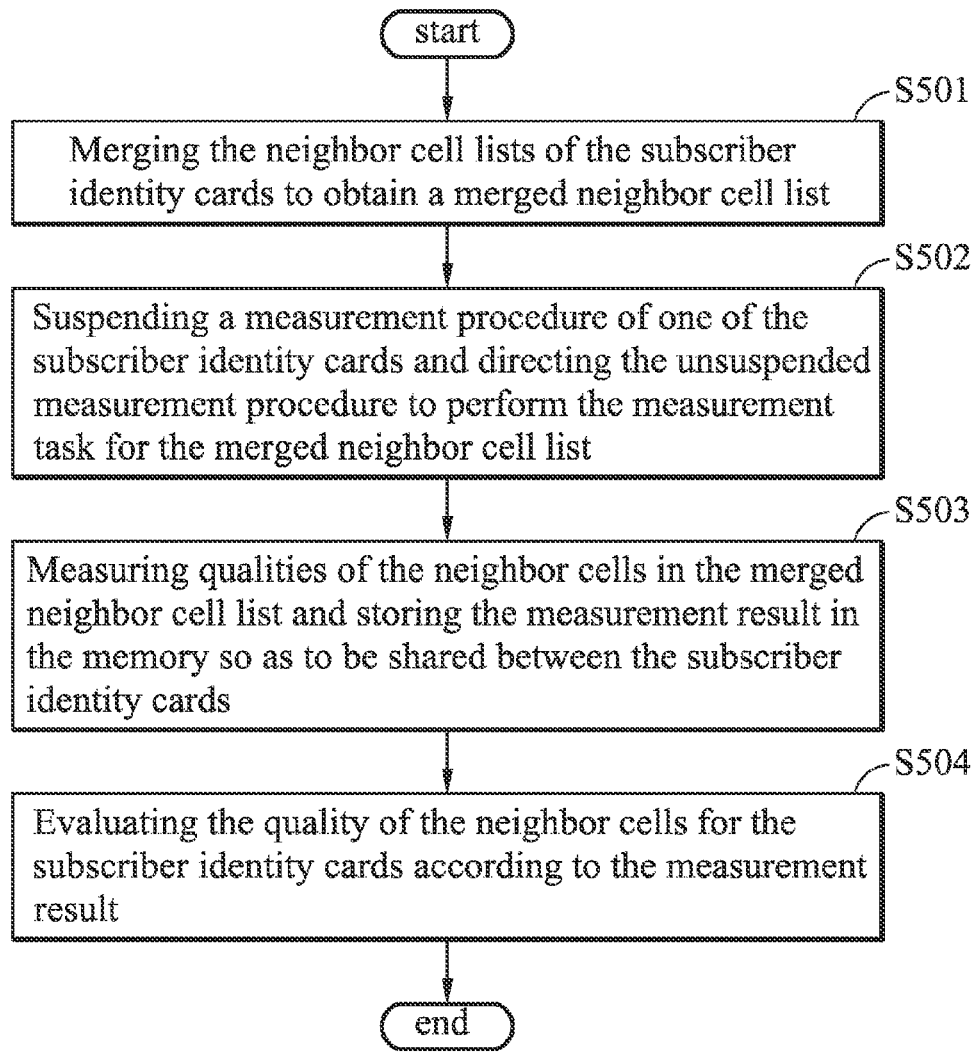
FIG. 5 shows a flow chart of a method for integrating cell measurement procedures of the subscriber identity cards according to a first embodiment of the invention.

FIG. 5 shows a flow chart of a method for integrating cell measurement procedures of the subscriber identity cards according to a first embodiment of the invention. As shown in FIG. 5, the processor (e.g. 105, 105A, 105B or 105C) merges the neighbor cell lists NCListA and NCListB of the subscriber identity cards 101 and 102 to obtain a merged neighbor cell list (Step S501). Next, the processor suspends a measurement procedure of one of the subscriber identity cards and directs the unsuspended measurement procedure to perform the measurement task for the merged neighbor cell list (Step S502). Next, the processor triggers the unsuspended measurement procedure to measures qualities of the neighbor cells in the merged neighbor cell list (Step S503). According to the embodiment of the invention, the measurement procedure may be periodically performed. As an example, a tick may be periodically sent by a lower layer hardware device or software module to notify the upper layer one to trigger the unsuspended measurement procedure. When the measurement procedure is triggered, an oscillator in one radio transceiver module (e.g. 104, 104A or 104B) may be tuned to the corresponding channel frequencies of the neighbor cells in the merged neighbor cell list to respectively receive signals from the neighbor cells, in which the quality of the neighbor cells may be measured according to the signal power of corresponding received signals. The measurement result may be stored in the memory (e.g. 106, 106A, 106B or 106C) to be shared between the subscriber identity cards 101 and 102. Thus, according to the first embodiment of the invention, the common neighbor cell(s) of the subscriber identity cards 101 and 102 may only be measured once during every periodic measurement procedure. Thus, the battery power is greatly saved. Finally, the processor may evaluate the quality of the neighbor cells for the subscriber identity cards 101 and 102 to further determine whether to trigger a cell reselection procedure for the subscriber identity cards 101 and 102 respectively (step S504).

Figure 6:
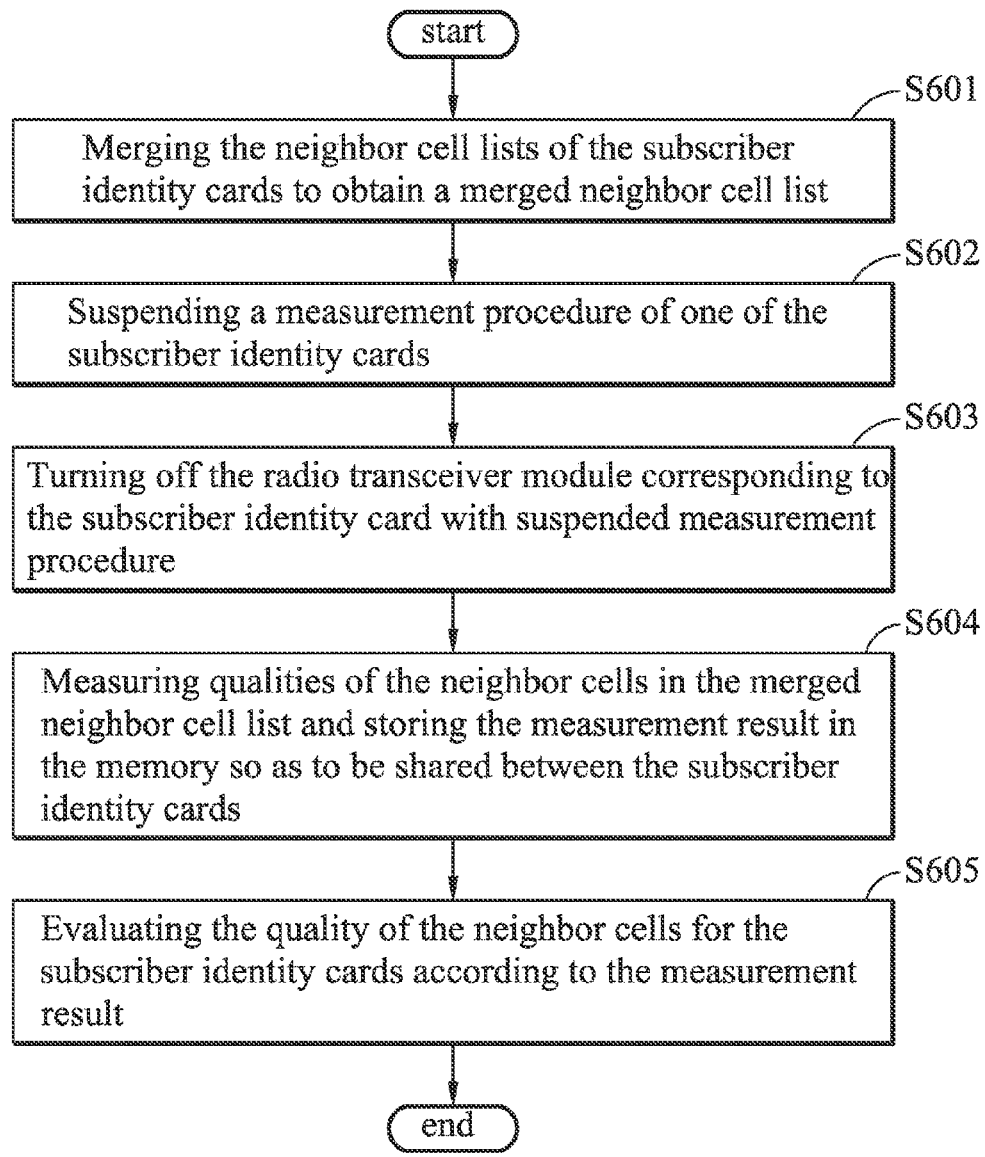
FIG. 6 shows another flow chart of a method for integrating cell measurement procedures of the subscriber identity cards according to the first embodiment of the invention.

According to the first embodiment of the invention, when the communication apparatus 100 is equipped with two radio transceiver modules (such as 104A and 104 B shown in FIG. 3) each respectively corresponding to one of the subscriber identity cards 101 and 102, the radio transceiver module corresponding to the subscriber identity card with the suspended measurement procedure may also be turned off so as to further save battery power. FIG. 6 shows another flow chart of a method for integrating cell measurement procedures of the subscriber identity cards according to the first embodiment of the invention, with the communication apparatus 100 being equipped with more than one radio transceiver module. As shown in FIG. 6, steps S601-S602 and S604-S605 are respectively similar to steps S501-S502 and S503-S504, and are omitted here for brevity. In step S603, the radio transceiver module corresponding to the subscriber identity card with suspended measurement procedure is turned off to further save battery power. According to the embodiment of the invention, the radio transceiver module corresponding to the suspended measurement procedure may be turned on again when it is further determined that a cell reselection procedure should be triggered according to the evaluation results.

According to a second embodiment of the invention, when the processor (e.g. 105, 105A, 105B or 105C) determines that the PLMNA and PLMNB are the same PLMN, and the serving cells Serving CellA and Serving CellB are also the same, the processor may further combine the cell reselection procedures of the subscriber identity cards into one cell reselection procedure, so as to save battery power. When camping on a cell, the communication apparatus 100 may periodically search for a better quality cell for each subscriber identity card according to the cell reselection criteria in an idle mode or a connected mode. For example, if the communication apparatus 100 is moved, the current camped on cell (i.e. serving cell) may become unsuitable. Hence, the communication apparatus 100 may perform a cell reselection procedure to reselect a suitable cell as a next serving cell for each subscriber identity card. The communication apparatus 100 may periodically measure the neighbor cells' power (e.g. as in the measurement procedure previously described) and the obtained measurement result (e.g. in steps S504 and S605) may be a reference of the cell reselection procedure. According to the second embodiment of the invention, since the current serving cells Serving CellA and Serving CellB are also the same, the neighbor cell lists NCListA and NCListB may also be the same. Thus, the cell reselection decision may be made by one subscriber identity card, and the system information of a candidate suitable cell may also be collected by the subscriber identity card and shared to the other subscriber identity card.

Figure 7:
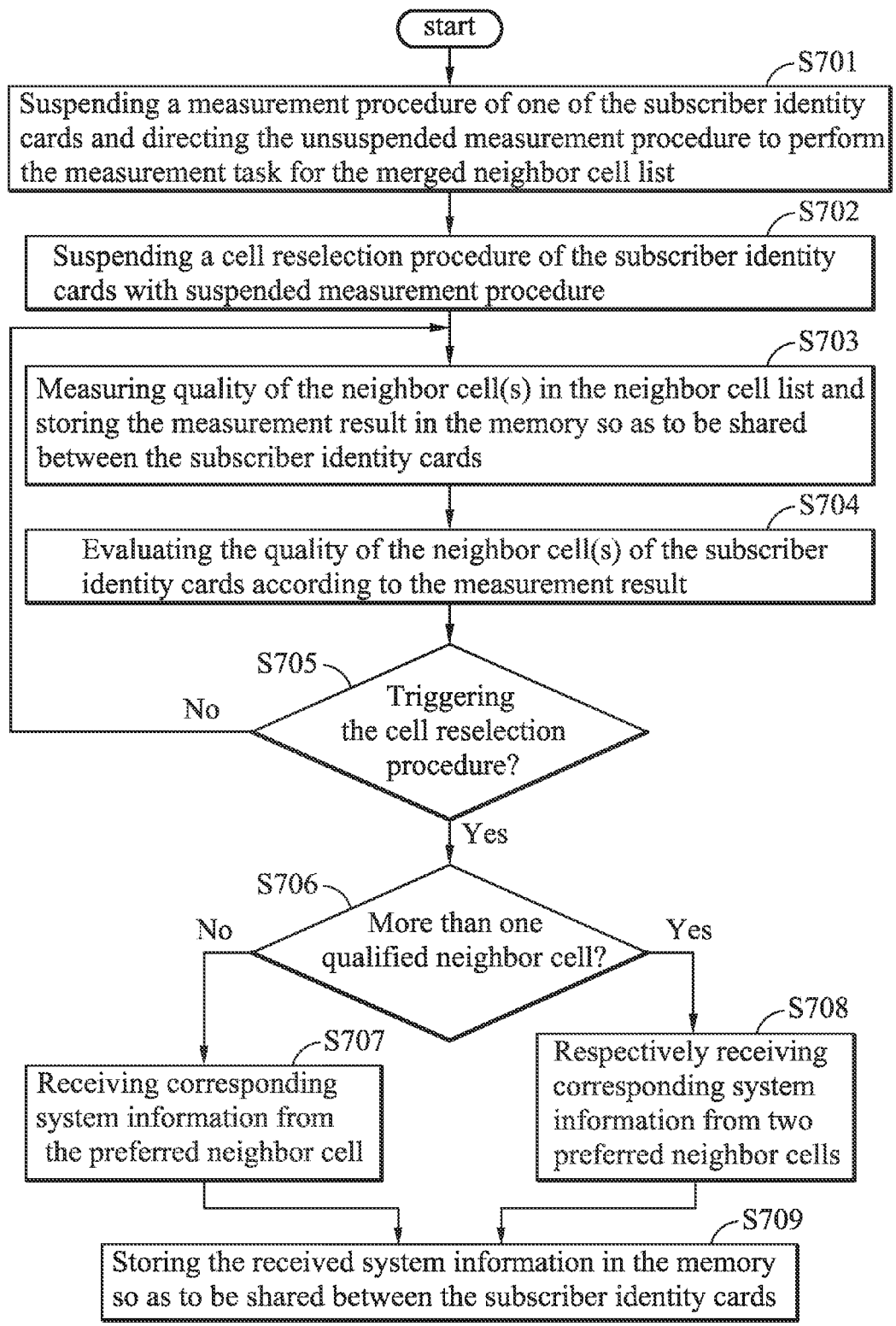
FIG. 7 shows a flow chart of a method for integrating cell measurement procedures of the subscriber identity cards according to a second embodiment of the invention.

FIG. 7 shows a flow chart of a method for integrating cell measurement procedures of the subscriber identity cards according to a second embodiment of the invention. As shown in FIG. 7, the processor (e.g. 105, 105A, 105B or 105C) suspends a measurement procedure of one of the subscriber identity cards and direct the unsuspended measurement procedure to perform the measurement task for the merged neighbor cell list (Step S701). Next, the processor also suspends a cell reselection procedure of the subscriber identity card with a suspended measurement procedure (Step S702). Next, the processor triggers the unsuspended measurement procedure to measures quality of the neighbor cell(s) in the neighbor cell list (Step S703). As previously described, the measurement result may be stored in the memory (e.g. 106, 106A, 106B or 106C) to be shared between the subscriber identity cards 101 and 102. Next, the processor evaluates the quality of the neighbor cell(s) according to the measurement result (Step S704). When at least one neighbor cell with signal quality better than the current serving cell, the processor may obtain a preferred neighbor cell list comprising the detected neighbor cell (s) (also called preferred neighbor cell(s)). Next, the processor determines whether to trigger the cell reselection procedure (Step S705). As previously described, according to some predetermined reselection criteria, when the current serving cell is determined to be not suitable anymore and there is one or more neighbor cells that is/are capable of providing stronger signal power than the current serving cell, a cell reselection procedure may be triggered. When there is no need to trigger the cell reselection procedure, the procedure may go back to step S703 to perform the next run of quality measurement for the neighbor cell(s).

On the other hand, when the processor determines to trigger the cell reselection procedure, the processor further determines whether there is more than one preferred neighbor cell in the preferred neighbor cell list (Step S706). When there is only one preferred neighbor cell, the processor further triggers the subscriber identity card with the unsuspended measurement procedure to receive corresponding system information from the preferred neighbor cell (Step S707). When there is more than one preferred neighbor cell, the processor further triggers both of the subscriber identity cards 101 and 102 to respectively receive corresponding system information from the two preferred neighbor cells with top two best quality in the preferred neighbor cell list in parallel (Step S708). Finally, the received system information of the preferred neighbor cell(s) are stored in the memory so as to be shared between the subscriber identity cards 101 and 102 (Step S709), and the subscriber identity cards 101 and 102 may further decide whether to reselect (camp on) the preferred neighbor cell according to the received system information. According to an embodiment of the invention, one subscriber identity card (or the corresponding processor) may decide whether a preferred neighbor cell is suitable to be the next serving cell according to the received system information and determine whether to reselect the decided cell, and the other subscriber identity card may follow the same decision to reselect the decided cell. According to another embodiment of the invention, subscriber identity cards 101 and 102 (or the corresponding processor(s)) may respectively determine a suitable neighbor cell and determine whether to reselect the determined cell.

Figure 8A:
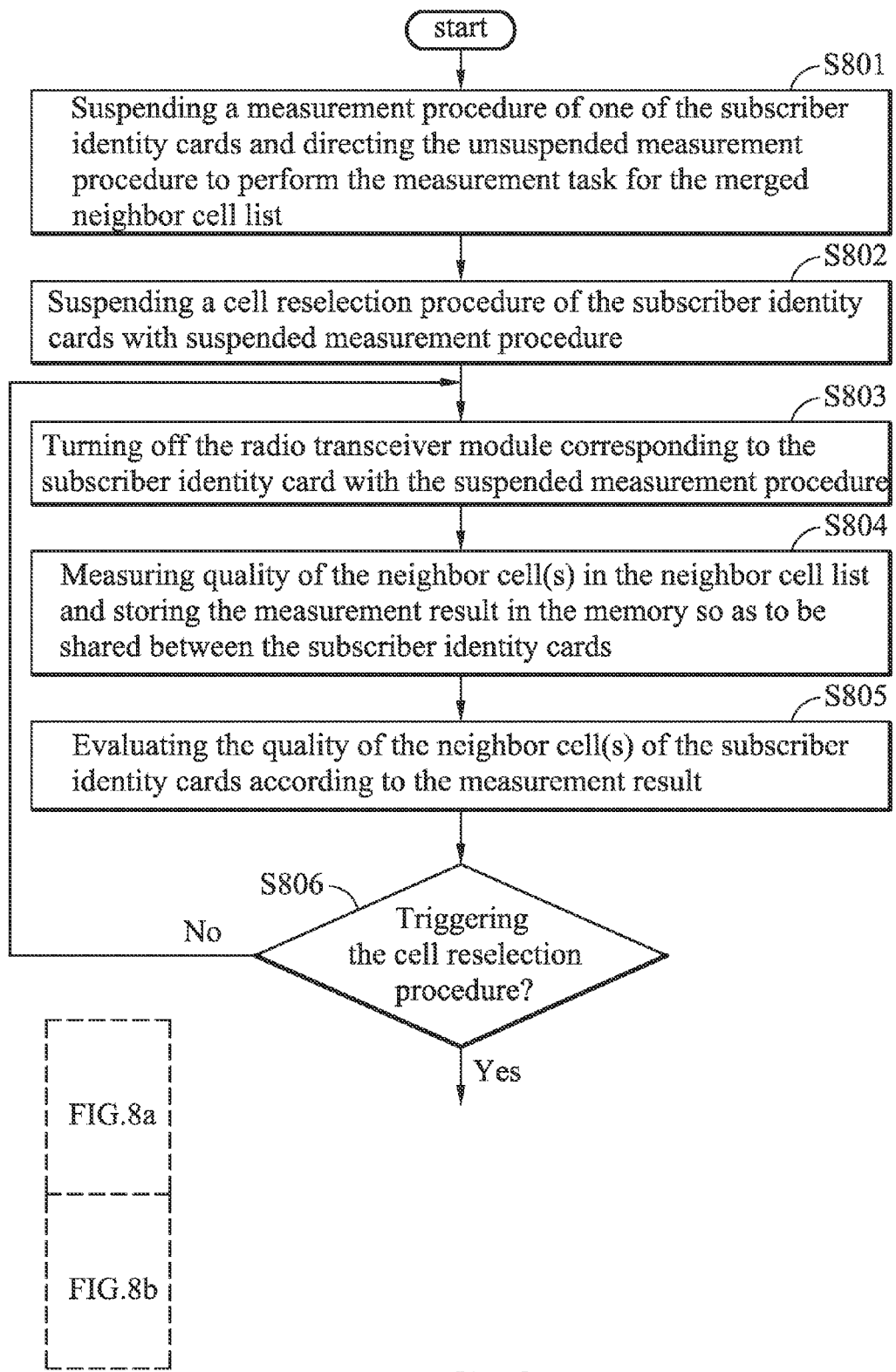
FIG. 8a and FIG. 8b show another flow chart of a method for integrating cell measurement procedures of the subscriber identity cards according to the second embodiment of the invention.
Figure 8B:
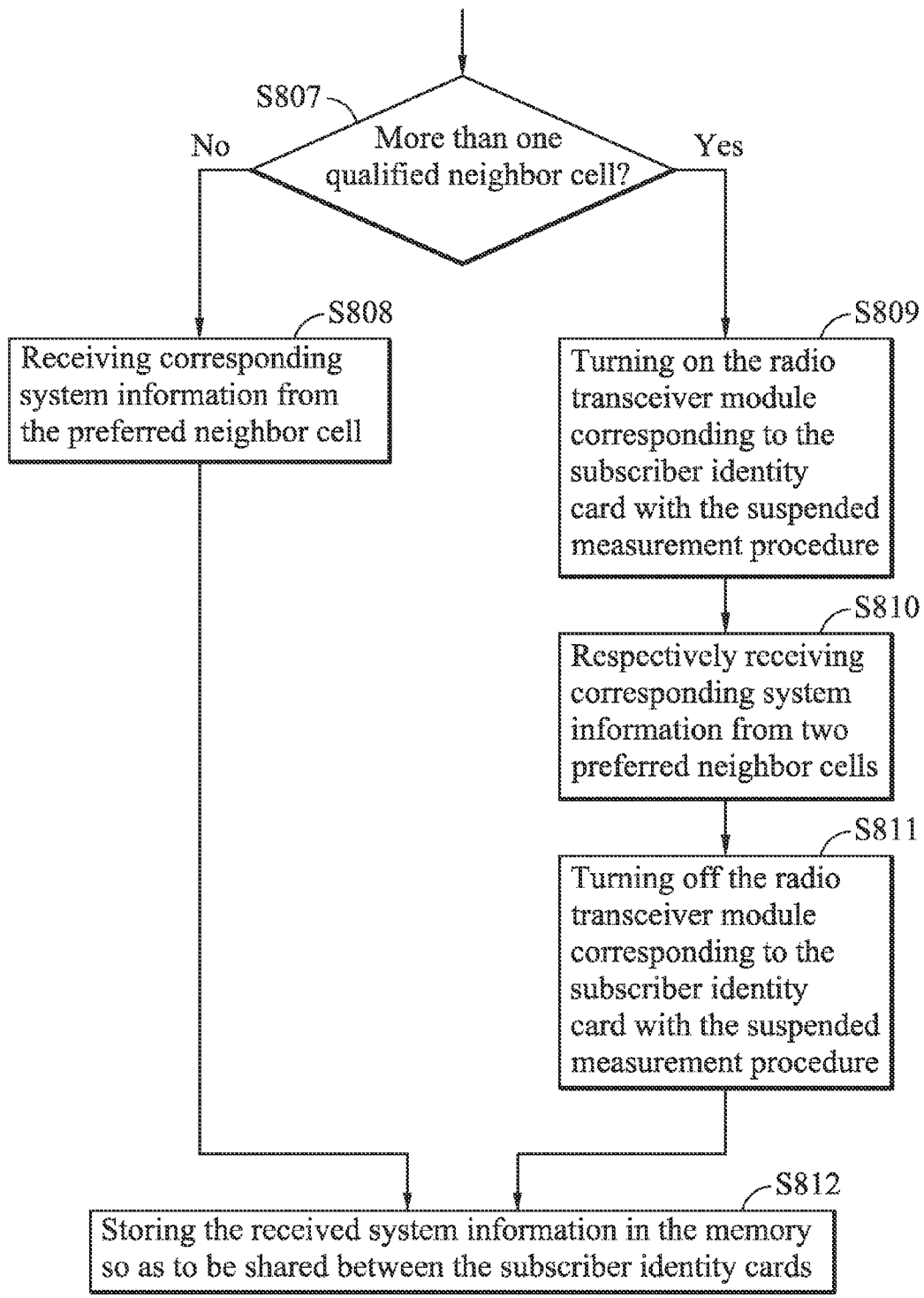

According to the second embodiment of the invention, when the communication apparatus 100 is equipped with two radio transceiver modules (such as 104A and 104 B shown in FIG. 3) each respectively corresponding to one of the subscriber identity cards 101 and 102, the corresponding radio transceiver module corresponding to the subscriber identity card with the suspended measurement procedure may also be turned off so as to further save battery power as previously described. FIG. 8a and FIG. 8b show another flow chart of a method for integrating cell measurement procedures of the subscriber identity cards according to the second embodiment of the invention, with the communication apparatus 100 being equipped with more than one radio transceiver module. As shown in FIG. 8a and FIG. 8b, steps S801-S802 are respectively similar to steps S701-S702, steps S804-S808 are respectively similar to steps S703-S707, and steps S810 and S812 are respectively similar to steps S708 and S709, and are omitted here for brevity. In step S803, the radio transceiver module corresponding to the subscriber identity card with the suspended measurement procedure is turned off to further save battery power. In step S809, the radio transceiver module corresponding to the subscriber identity card with the suspended measurement procedure is turned on so that the communication apparatus may receive corresponding system information from two preferred neighbor cells simultaneously via two radio transceiver modules, and the radio transceiver module is turned off again in Step S811 after receiving the corresponding system information to further save battery power.

Figure 9A:
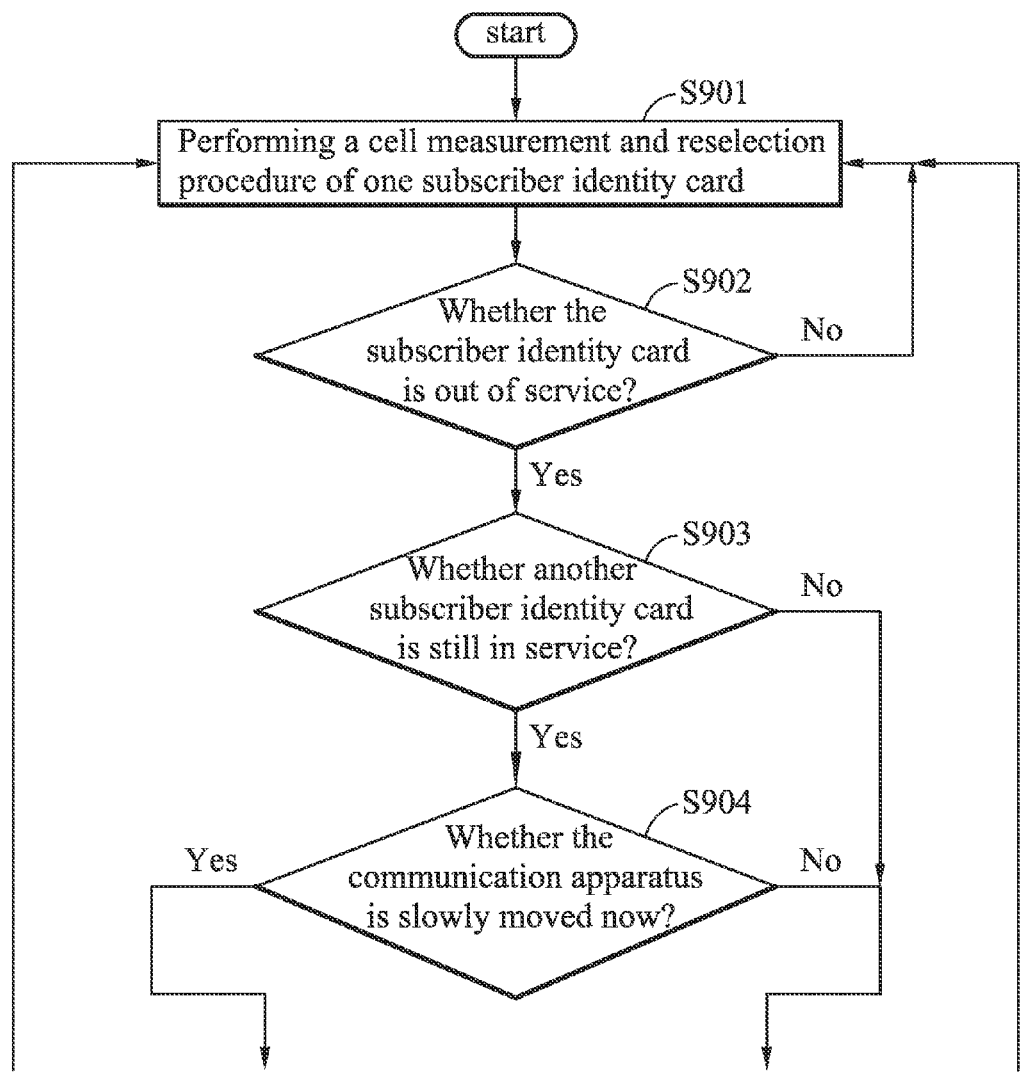
FIG. 9a and FIG. 9b show a flow chart of a method for integrating cell measurement procedures of the subscriber identity cards according to a third embodiment of the invention.
Figure 9B:
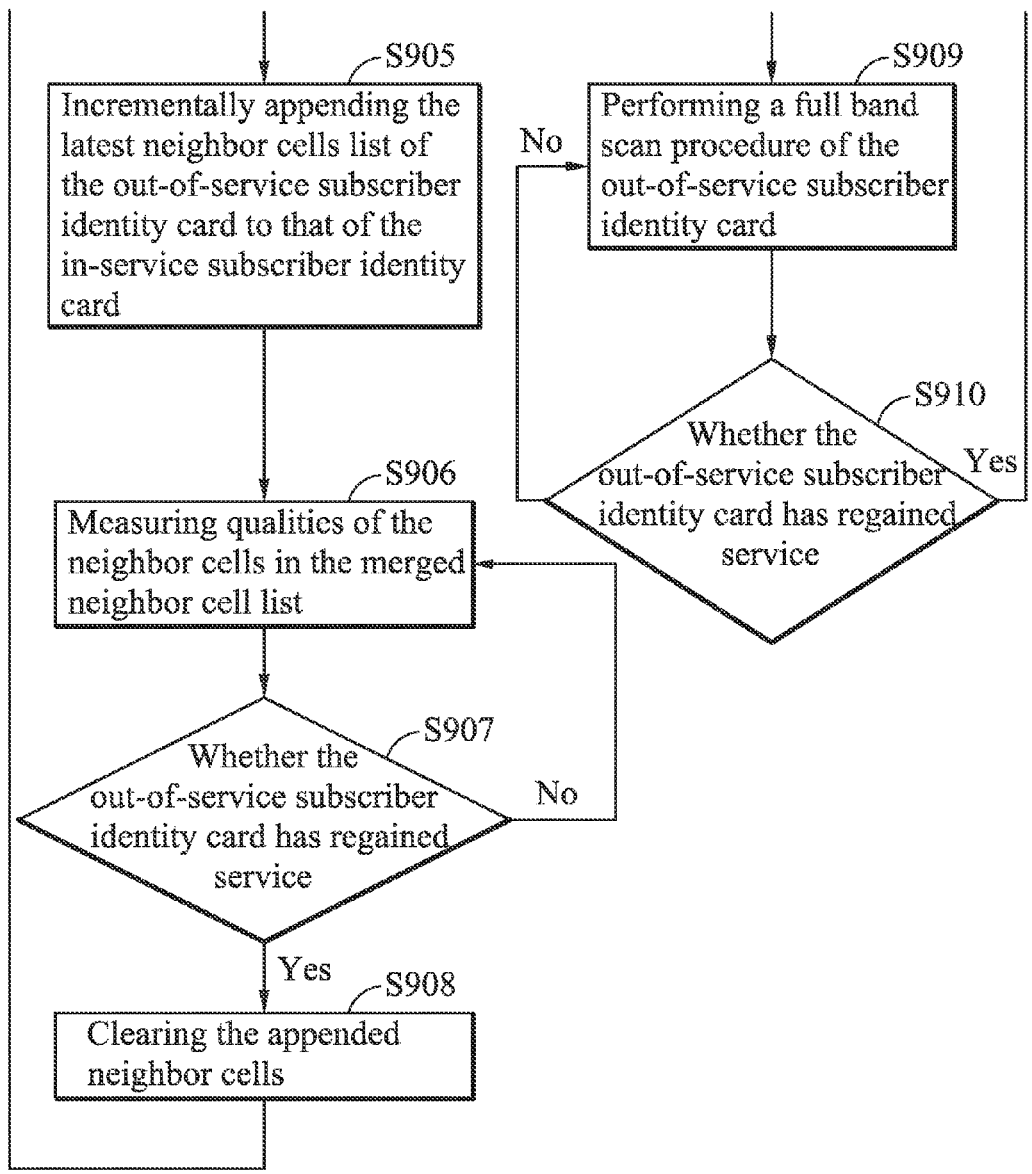

According to a third embodiment of the invention, when the processor (e.g. 105, 105A, 105B or 105C) determines that the PLMNA and PLMNB are not the same PLMN, the processor may also integrate the cell measurement task under some circumstances. According to the third embodiment of the invention, when the communication apparatus 100 is moved to an area without radio coverage of one PLMN (for example, PLMNA), the neighbor cell list of the subscriber identity card 101 may also be merged to that of the subscriber identity card 102 so as to regain service with reference to power measuring of the latest neighbor cells via the subscriber identity card 102, instead of blindly performing a full band scan. FIG. 9a and FIG. 9b show a flow chart of a method for integrating cell measurement procedures of the subscriber identity cards according to a third embodiment of the invention. The process begins when a cell measurement and reselection procedure of either one subscriber identity card is performed (Step S901). According to the cell reselection results, the processor determines whether the subscriber identity card (e.g. 101) is out of radio coverage (or so-called out of service) of its corresponding PLMN (e.g. PLMNA) (Step S902). As an example, when the serving cell is not suitable anymore, and there is also no other qualified neighbor cells, the subscriber identity card may be determined out of radio coverage of its corresponding PLMN. When the subscriber identity card is not out of service, the process goes back to the periodic cell measurement and reselection procedures in step S901. On the other hand, when the subscriber identity card is out of service, the processor further determines whether another subscriber identity card (e.g. 102) is still in radio coverage of its corresponding PLMN (e.g. PLMNB) (Step S903). When the subscriber identity card 102 is still in service, the processor further determines whether the communication apparatus 100 has now slowly moved according to a mobility status (Step S904). The processor may continuously monitor a total number of cell reselections nCR for the subscriber identity card for a past time period Tcrmax and accordingly obtain the mobility status thereof. For example, the processor obtains a fast-moving status when detecting seven or more cell reselections for a past time period (e.g. one ranging from 2 to 4 seconds), a normal-moving status when detecting that a total number of cell reselections is less than seven and greater than five for the past time period, and a slow-moving status when detecting five or less cell reselections for the past time period. It is noted that the processor may determine whether the communication apparatus 100 has moved slowly or quickly according to other criteria and the invention should not be limited thereto. When the communication apparatus 100 is moved slowly, the processor incrementally appends the latest neighbor cell lists NCListA of the subscriber identity card 101 into the NCListB of the subscriber identity card 102 (Step S905). Next, the processor periodically triggers a measurement procedure (as previously described) of the subscriber identity card 102 to receive the signals from the neighbor cells in the merged neighbor cell list so that the neighbor cells for the out-of-service subscriber identity card 101 are still monitored and measured by the subscriber identity card 102 for future service regain (Step S906). For example, when the communication apparatus 100 is currently moved into an elevator, the subscriber identity card may be temporarily out of service. Since the communication apparatus 100 is slowly moved in the horizontal direction, the neighbor cells may remain unchanged. Thus, a normal service regain according to the latest neighbor cell list may be performed instead of a full band scan so as to reduce search time and power consumption. Next, the processor determines whether the out-of-service subscriber identity card 101 has regained service according to the measurement result (Step S907). As an example, the processor evaluates the quality of the neighbor cell of the out-of-service subscriber identity card 101 according to the measurement result to obtain a qualified cell, and triggers a service regain procedure for the subscriber identity card 101 to camp on the qualified cell. When the subscriber identity card 101 regains service, the appended neighbor cells for the subscriber identity card 101 is cleared from the NCListB (Step S908). On the other hand, when the subscriber identity card 101 has not regained service, the procedure goes back to step S906 to keep monitoring the neighbor cells for the out-of-service subscriber identity card 101.

When the communication apparatus 100 is not moved slowly or when the other subscriber identity card (e.g. 102) is also out of the radio coverage of its corresponding PLMN, the processor triggers a full band scan procedure of the subscriber identity card 101 (Step S909) so as to facilitate the subscriber identity card 101 to regain service. As an example, during the full band scan procedure, the processor may find out at least one cell for the subscriber identity card 101, trigger a measurement procedure of the subscriber identity card 101 to receive the signals from one of the found cells, evaluate the quality of the cell for the subscriber identity card 101 according to the measurement result to obtain a qualified cell, and trigger a service regain procedure for the subscriber identity card 101 to attempt to camp on the qualified cell. Next, the processor determines whether the out-of-service subscriber identity card 101 has regained service according to the measurement result (Step S910). When the subscriber identity card 101 regains service, the procedure goes back to step S901. On the other hand, when the subscriber identity card 101 does not regain service, the procedure goes back to step S909 to locate another qualified cell.

Figure 10A:
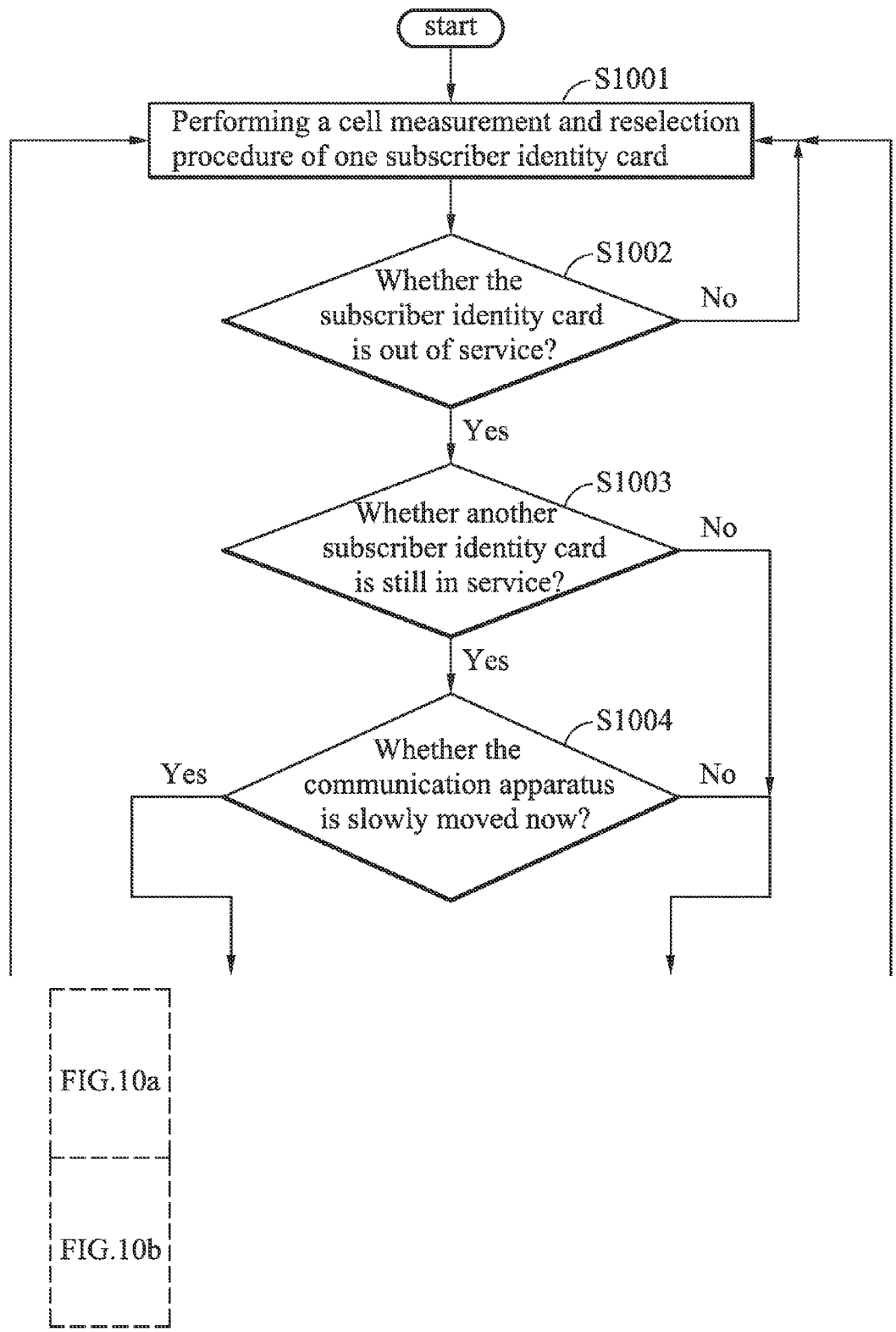
FIG. 10a and FIG. 10b show another flow chart of a method for integrating cell measurement procedures of the subscriber identity cards according to the third embodiment of the invention.
Figure 10B:
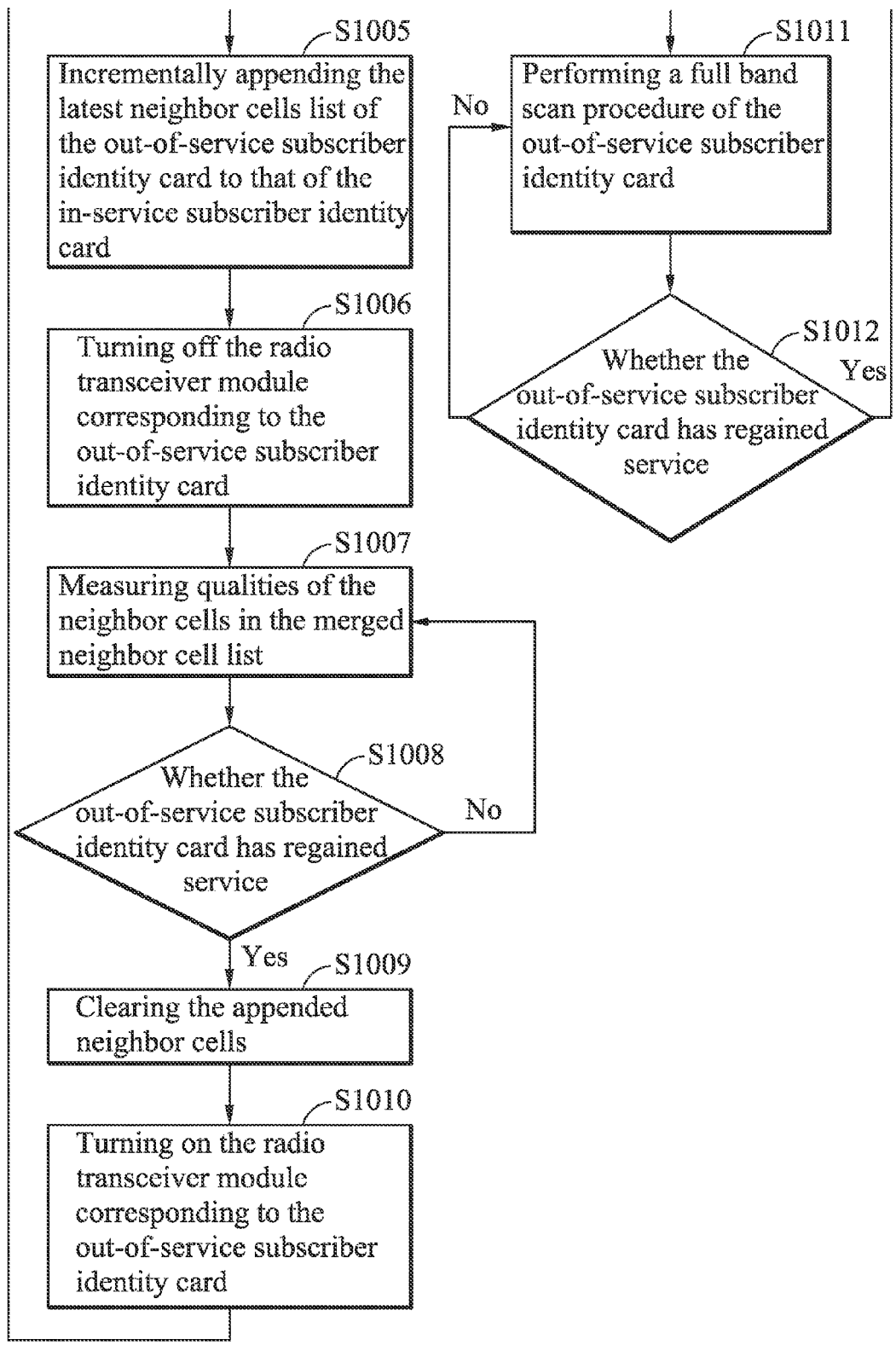

According to the third embodiment of the invention, when the communication apparatus 100 is equipped with two radio transceiver modules (such as 104A and 104 B shown in FIG. 3) each respectively corresponding to one of the subscriber identity cards 101 and 102, the corresponding radio transceiver module of the out-of-service subscriber identity card may also be turned off so as to further save battery power as previously described. FIG. 10a and FIG. 10b show another flow chart of a method for integrating cell measurement procedures of the subscriber identity cards according to the third embodiment of the invention, with the communication apparatus 100 being equipped with more than one radio transceiver module. As shown in FIG. 10a and FIG. 10b, steps S1001-S1005 are respectively similar to steps S901-S905, steps S1007-S1009 are respectively similar to steps S906-S908, and steps S1011-S1012 are respectively similar to steps S909-S910, and are omitted here for brevity. In step S1006, the radio transceiver module corresponding to the out-of-service subscriber identity card (e.g. 101) is turned off to further save battery power. In step S1010, the radio transceiver module corresponding to the out-of-service subscriber identity card is turned on again when the service is regained.

Figure 11:
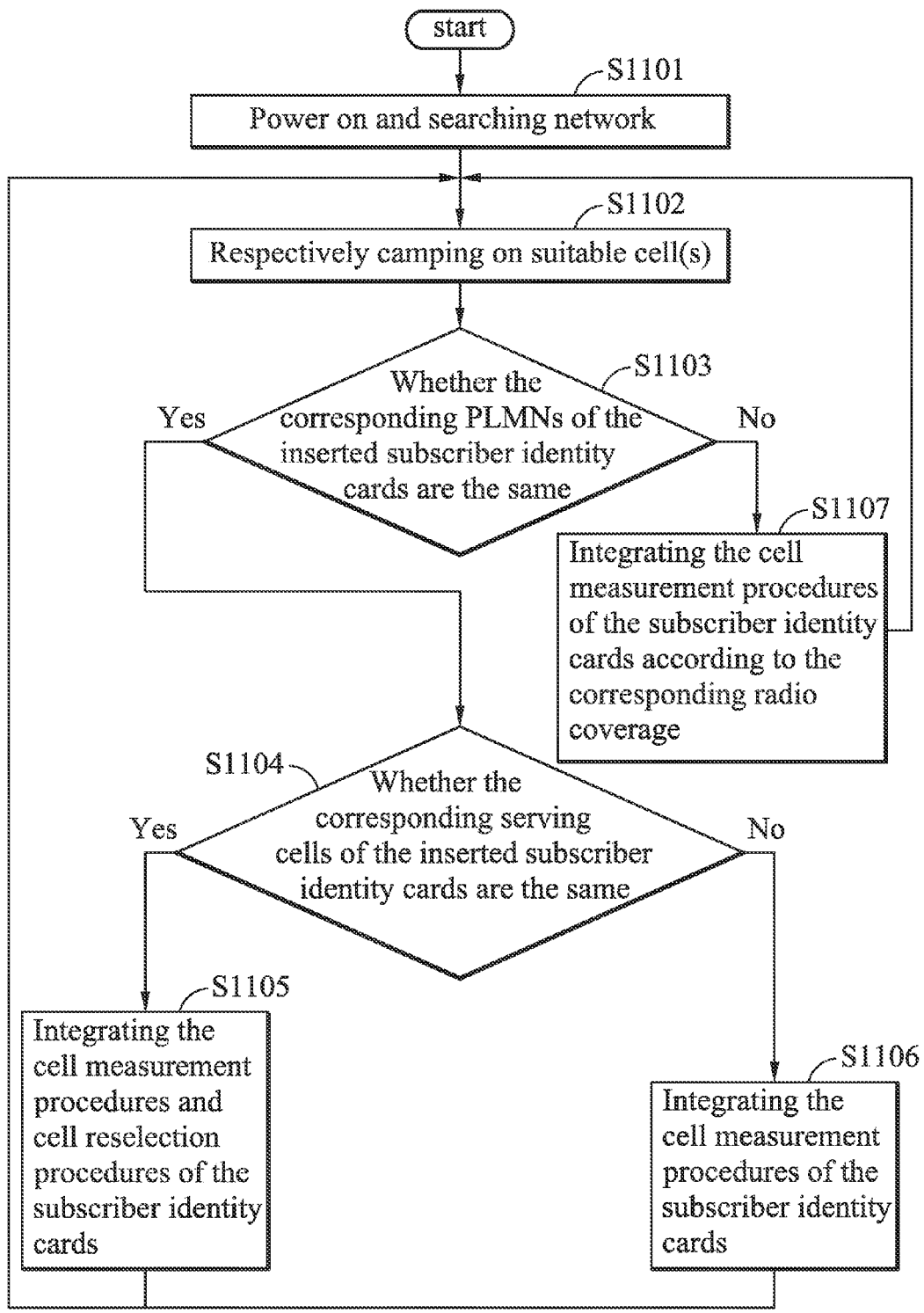
FIG. 11 shows a flow chart of the method for intelligently selecting different cell measurement integral processes according to a fourth embodiment of the invention.

FIG. 11 shows a flow chart of the method for intelligently selecting one cell measurement integration process mentioned above according to a fourth embodiment of the invention. As previously described, when the communication apparatus 100 is powered on and a network search is performed (Step S1101), each subscriber identity card selects and camp on a suitable cell (Step S1102). Next, the processor determines whether the corresponding PLMNs (for example, PLMNA and PLMNB) of the inserted subscriber identity cards are the same (Step S1103). When the PLMNs are not the same, the processor integrates the cell measurement procedures of the subscriber identity cards according to the corresponding radio coverage (Step S1107). For related integration methods, reference may be made to the third embodiment as shown in FIG. 9a and FIG. 9b and FIG. 10a and FIG. 10b and the corresponding description previously introduced. When the PLMNs are the same, the processor further determines whether the corresponding serving cells of the inserted subscriber identity cards are the same (Step S1104). When the corresponding serving cells of the inserted subscriber identity cards are the same, the processor integrates the cell measurement procedures and cell reselection procedures of the subscriber identity cards (Step S1105). For related integration methods, reference may be made to the second embodiment as shown in FIG. 7, FIG. 8a and FIG. 8b and the corresponding description previously introduced. When the corresponding serving cells of the inserted subscriber identity cards are not the same, the processor integrates the cell measurement procedures of the subscriber identity cards (Step S1106). For related integration methods, reference may be made to the first embodiment as shown in FIG. 5 and FIG. 6 and the corresponding description previously introduced. For the intelligent integration mechanism of the invention, duplicated measurement and cell reselection tasks or unnecessary full band scans may be prevented, thus greatly conserving battery power.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus having at least one radio transceiver module, a first subscriber identity card and a second subscriber identity card, where the first subscriber identity card corresponds to a first public land mobile network (PLMN), and the second subscriber identity card corresponds to a second PLMN, the communication apparatus comprising:
    processor logic determining whether the first PLMN and the second PLMN are the same;
    processor logic, when the first and the second PLMNs are the same, suspending a measurement procedure and a cell reselection procedure of one of the first subscriber identity card and the second subscriber identity card to reduce battery power consumption;
    processor logic triggering an unsuspended measurement procedure to tune the radio transceiver module to a plurality of corresponding channel frequency/frequencies of the neighbor cells to respectively receive a plurality of signals from the neighbor cells therein, and accordingly measuring and evaluating quality of the neighbor cells therein; and
    processor logic triggering an unsuspended cell reselection procedure to determine whether to reselect one neighbor cell with better quality than that of the corresponding serving cell according to measurement and evaluation results.

2. The communication apparatus as claimed in claim 1, further comprising processor logic receiving system information from the neighbor cell with better quality than that of the corresponding serving cell via the radio transceiver module, and shares the received system information to the suspended cell reselection procedure.

3. The communication apparatus as claimed in claim 2, further comprising processor logic camping on the neighbor cell with better quality than that of the corresponding serving cell for both the first and second subscriber identity cards.

4. The communication apparatus as claimed in claim 1, wherein at least one of the first subscriber identity card and the second subscriber identity card is the subscriber identity module (SIM) card corresponding to the global system for mobile communications (GSM), the universal subscriber identity module (USIM) card corresponding to the universal mobile telecommunications system (UMTS) or time division-synchronous code division multiple access (TD-SCDMA) network, or the removable user identity module (RUIM) card or the CDMA subscriber identity module (CSIM) card corresponding to the code division multiple access (CDMA) 2000 communication system.

5. The communication apparatus as claimed in claim 1, wherein the communication apparatus accompanies with two radio transceiver modules respectively corresponding to the first and the second subscriber identity cards, further comprising:
    processor logic turning off the radio transceiver module corresponding to the subscriber identity card with the suspended measurement procedure.

6. A method for integrating cell measurement procedures of a communication apparatus, wherein the communication apparatus comprises at least one radio transceiver module, a first subscriber identity card belonging to a first public land mobile network (PLMN), a second subscriber identity card belonging to a second PLMN, and a processor, the method being performed by the processor and comprising:

receiving determining whether the first PLMN and the second PLMN are the same;

when the first and the second PLMNs are the same, suspending a measurement procedure and a cell reselection procedure of one of the first subscriber identity card and the second subscriber identity card to reduce battery power consumption;

triggering an unsuspended measurement procedure to tune to a plurality of corresponding channel frequency/frequencies of the neighbor cells to respectively receive a plurality of signals from the neighbor cells therein, and accordingly measuring and evaluating quality of the neighbor cells therein;

triggering an unsuspended cell reselection procedure to determine whether to reselect one neighbor cell with better quality than that of the corresponding serving cell according to measurement and evaluation results.

7. The method as claimed in claim 6, further comprising receiving system information from the neighbor cell with better quality than that of the corresponding serving cell, and shares the received system information to the suspended cell reselection procedure.

8. The method as claimed in claim 7, further comprising camping on the neighbor cell with better quality than that of the corresponding serving cell for both the first and second subscriber identity cards.

9. The method as claimed in claim 6, at least one of the first subscriber identity card and the second subscriber identity card is the subscriber identity module (SIM) card corresponding to the global system for mobile communications (GSM), the universal subscriber identity module (USIM) card corresponding to the universal mobile telecommunications system (UMTS) or time division-synchronous code division multiple access (TD-SCDMA) network, or the removable user identity module (RUIM) card or the CDMA subscriber identity module (CSIM) card corresponding to the code division multiple access (CDMA) 2000 communication system.

* * * * *